March 16, 1926.
T. C. MUSSEN
1,577,143
CUSHION TIRE
Filed Nov. 7, 1924
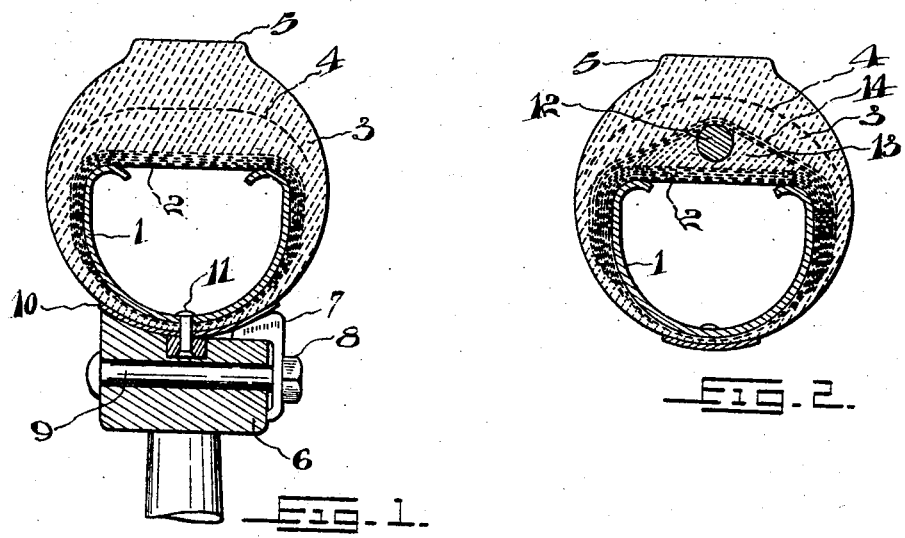
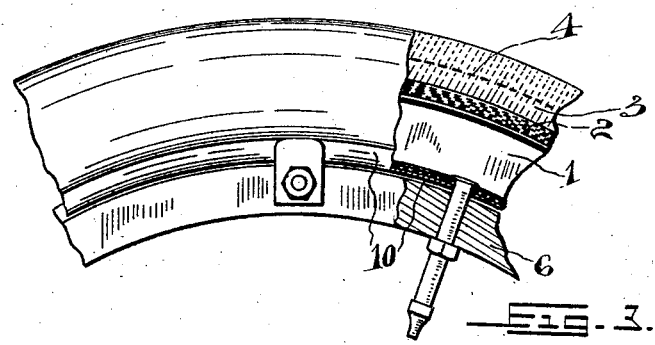
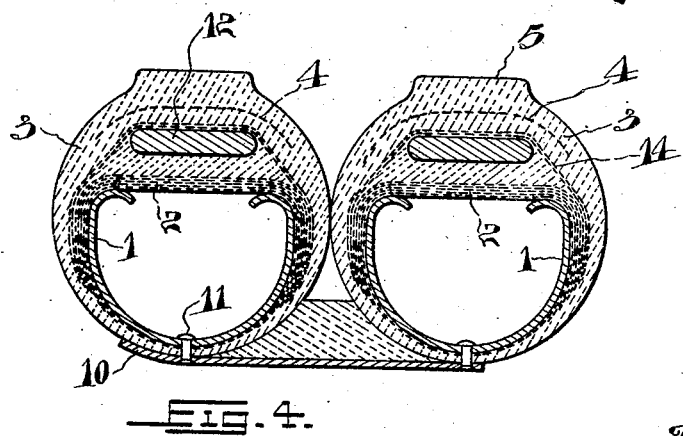
INVENTOR
J. C. Mussen.
BY J. Edward Maybee
ATTY Patented Mar. 16, 1926.

1,577,143

UNITED STATES PATENT OFFICE.

THOMAS C. MUSSEN, OF TORONTO, ONTARIO, CANADA.

CUSHION TIRE.

Application filed November 7, 1924. Serial No. 748,456.

*To all whom it may concern:*

Be it known that I, THOMAS C. MUSSEN, of the city of Toronto, in the county of York, Province of Ontario, Canada, a subject of the King of Great Britain, have invented certain new and useful Improvements in Cushion Tires, of which the following is a specification.

This invention relates to tires in which the resiliency of the tire is due to the elasticity of suitably disposed solid material and my object is to provide a cheap, durable and efficient tire adapted to be directly positioned on a felloe of the type ordinarily used with detachable tire rims.

I attain my object by means of a construction which may be briefly described as follows. A metal rim of U-section is so shaped as to fit an ordinary felloe equipped for the carrying of an ordinary detachable rim. A bridge formed of a plurality of plies of fabric frictioned with rubber spans the opening of the rim, one or more of the plies of fabric extending substantially to or around the felloe engaging side of the rim. A rubber tread and side walls are vulcanized to the fabric. A ring of substantially incompressible material is also preferably included in the tread adjacent the fabric bridge.

The invention is hereinafter more specifically described and is illustrated in the accompanying drawings in which—

Fig. 1 is a cross section of my improved tire in position on a wheel felloe;

Fig. 2 a similar view of a modification;

Fig. 3 a side elevation, on a smaller scale, of part of a wheel felloe with a tire of the form shown in Fig. 1 in position and shown in part section; and Fig. 4 a cross section of a double tire constructed in accordance with my invention.

In the drawings like numerals of reference indicate corresponding parts in the different figures.

1 is a U-shaped metal rim, the channel being of considerable depth and the edges curved inwardly and downwardly to form a rounded seat for the fabric bridge which the rim is adapted to carry. This rim is substantially continuous so that it possesses a considerable measure of rigidity. The fabric bridge 2 is formed of a plurality of layers of frictioned canvas. One or more of the layers of canvas extend substantially to the centre of the felloe-engaging side of the rim. Preferably the first ply of frictioned canvas is extended completely round the rim, the remaining plies progressively having their edges at different distances from the centre line so that the bridge tapers in thickness from the edges to the felloe-engaging side of the tire. Care must be taken, however, that the fabric bridge has sufficient engagement with the outer side of the rim to resist the stresses to which the part of the bridge spanning the sides of the rim is subjected.

Over this canvas bridge is applied a rubber tread 3 which may be of ordinary type and provided with the breaker strip 4 of fabric between the inner and outer sides of its tread portion. This tread with its side walls is vulcanized to the outside of the fabric bridge. The centre 5 of the exterior surface of the tread is preferably raised somewhat as shown in order to concentrate the pressure over the portion of the bridge between the edges of the side walls of the U-shaped metal rim, thus securing to the fullest possible measure the resilient support of the bridge.

The outer surface of the U-shaped rim with its coating is adapted to fit the felloe 6, which is of the type commonly employed with detachable rims, the rim being held in position by clips 7 secured in place by means of the nuts 8 threaded on the studs 9.

From the above description it will be seen that I have devised a cushion tire formed of metal, fabric and rubber which may be fitted directly on to a wheel felloe without the use of rims such as commonly employed with pneumatic or other cushion tires.

To protect the fabric and rubber at the felloe side of the rim, I may provide the rim with a protective band 10 of metal secured by rivets 11 to the rim.

To further concentrate the load on the centre of the bridge where it spans the U-shaped rim, I provide, as shown in Fig. 2, an annular band 12 of relatively incompressible material, which is positioned over the centre of the bridge by means of a saddle 13 grooved to receive the band. In this case one or more plies of frictioned fabric 14 extend over the band and saddle and are cemented or vulcanized to the fabric of the bridge at the sides of the rim. This fabric 14 serves to properly transmit the load from the tread to the band and thence to the bridge.

The space within the rim being closely sealed, air may be forced therein under pressure to aid in maintaining or re-inforcing the resiliency of the bridge and tread.

Various modifications of this construction are possible which fall within the scope of my invention. For instance, two rims and tires constructed in accordance with my invention may be secured together side by side as shown in Fig. 4 and fitted on an extra wide felloe such as employed on the wheels of heavy duty trucks.

What I claim is:—

1. The combination of a wheel felloe; a U-shaped substantially continuous metal rim adapted to be positioned on or removed from the felloe; releasable means for locking the rim on the felloe; and a tire of rubber and fabric built up on the rim and bridging the opening therein.

2. A U-shaped substantially continuous metal rim adapted for detachable connection with a wheel felloe; a bridge formed of a plurality of plies of fabric frictioned with rubber spanning the opening of the rim and adhering to one another and the outer surface of the rim; and a tread and side walls of rubber vulcanized to the outer surface of the fabric.

3. A U-shaped substantially continuous metal rim adapted for detachable connection with a wheel felloe; a bridge formed of a plurality of plies of fabric frictioned with rubber spanning the opening of the rim and adhering to one another and the outer surface of the rim; a tread and side walls of rubber vulcanized to the outer surface of the fabric; a ring of relatively incompressible material of less width than the opening of the rim and embedded in the tread adjacent the bridge adapted to concentrate tread pressure on the bridge; and a breaker strip of fabric over said ring.

4. A U-shaped substantially continuous metal rim adapted for detachable connection with a wheel felloe; a bridge formed of a plurality of plies of fabric frictioned with rubber spanning the opening of the rim and adhering to one another and the outer surface of the rim; a tread and side walls of rubber vulcanized to the outer surface of the fabric; a saddle of elastic material seated on the bridge; a ring of relatively incompressible material of less width than the opening of the rim and fitted in the saddle adapted to concentrate tread pressure on the bridge; and a breaker strip of fabric over said ring.

5. A U-shaped substantially continuous metal rim adapted for detachable connection with a wheel felloe; a bridge formed of a plurality of plies of fabric frictioned with rubber spanning the opening of the rim and adhering to one another and the outer surface of the rim; a tread and side walls of rubber vulcanized to the outer surface of the fabric; a saddle of elastic material seated on the bridge; a ring of relatively incompressible material of less width than the opening of the rim and seated in the saddle adapted to concentrate tread pressure on the bridge; and a fabric over said ring.

Signed at Toronto, Canada, this 3rd day of Nov., 1924.

T. C. MUSSEN.